United States Patent Office 3,164,833
Patented Jan. 5, 1965

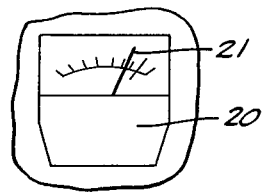
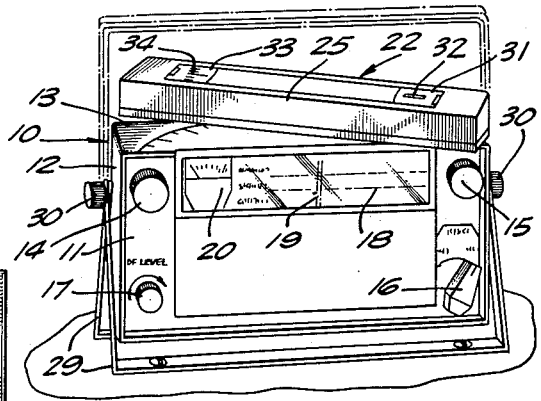
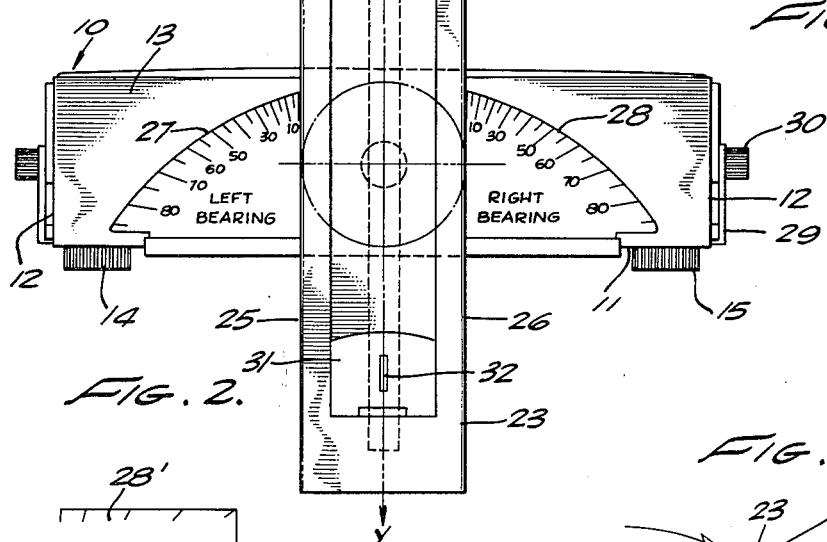
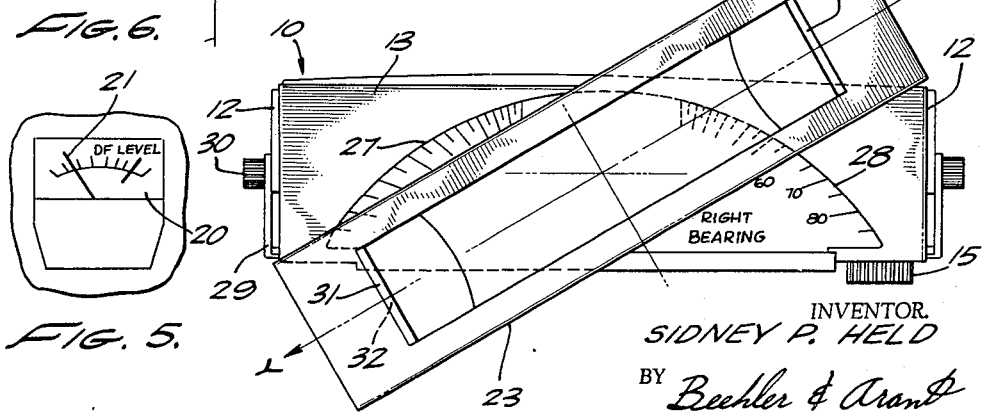

3,164,833
DIRECTION FINDER
Sidney P. Held, 617 Illinois Court, Apt. 9, Segundo, Calif.
Filed Nov. 6, 1962, Ser. No. 235,712
5 Claims. (Cl. 343—115)

This invention relates to radio direction finders.

Radio direction finders are well known and highly developed and, in accordance with present practice, usually comprise a radio receiving set having a direction-finding detector element which is the antenna of the set and is movable over an arcuate scale laid out in left and right bearings. The radio receiver incorporates a field intensity meter which registers the intensity of the field at any angular position of the antenna detector element and, at the particular position of the antenna where the field intensity is the lowest, a reading is provided on the right or left bearing scales and indicates the direction line of the sending station of the radio signal.

Present direction finders are subject to inherent objections and disadvantages in that the antenna-detector element is of appreciable size and at the same time has a very limited range of angular movement that is capable of being accurately indicated by the equipment.

These objections and disadvantages are overcome in the present invention wherein the scale is so laid out and related to the detector element that all angular positions within a 90 degree angle, either Left or Right, are readily readable. This is accomplished by the provision of a divided scale, the two halves or portions of which are graduated from two Zero marks or lines which do not register with each other but which do register with the side edges of the antenna-detector element when it is at the mid-position or Zero point of the respective scales. By reason of this construction and interrelation of the parts thereof improved accuracy of readings is possible for the reason that small angular movements of the antenna-detector element result in relatively large movements of the marker edge portions over the scale graduations.

It is therefore the primary purpose and objective of this invention to provide novel improvements in a radio direction finder having a higher degree of accuracy and versatility with respect to the operation thereof.

Another object of the invention is to provide a radio direction finder wherein there is provided a novel divided scale arrangement wherein a relatively small rotational movement of the detector element results in a relatively larger movement of the marker portion of the detector element over the scale portion thereof.

An additional object of the invention is to provide a novel radio direction finder wherein small angular movements of the detector element from a reference axis or zero line are registerable by relatively larger movements of the indicator element over the scale thereof.

Other objects and advantages will appear and be brought out more fully in the following specification, reference being had to the accompanying drawing. In the drawing:

FIGURE 1 is a perspective view of a radio direction finder incorporating the present invention;

FIGURE 2 is a top view of the same showing the detector element in a neutral or Zero position;

FIGURE 3 is a view similar to FIGURE 2 showing the antenna-detector element in an actuated position;

FIGURE 4 is a fragmentary view showing the direction finder level indicator in its initial or unactuated position;

FIGURE 5 is a view similar to FIGURE 4 showing the direction finder level indicator indicating a minimum field intensity by reason of the antenna-detector element having the position indicated in FIGURE 3.

Referring now to the drawing in more detail the direction finder of this invention is incorporated in a box-like housing or container 10 having a front wall 11, side walls 12 and a top 13. The housing encloses a radio receiver having control shafts that extend through front wall 11 on which are mounted, respectively, an On-Off and volume control knob 14, a tuning knob 15, a band selector knob 16 and a direction finder level knob 17. Front wall 11 has a window behind which is a scale 18 on which are inscribed one or more radio transmitter frequencies, and the receiver has a pointer or slider 19 movable across the scale 18 and actuated by tuning knob 15. Band selector switch 16 serves to tune or shift the receiver to the appropriate frequency being used.

A direction finder level indicator 20 is positioned to be visible through the window in front wall 11 and has a pointer 21 movable across the scale.

A detector element is indicated generally at 22 and comprises an elongated rectangular container 23 which suitably houses an antenna 24 that includes an elongated coil wound on a ferrite rod. The container 23 is shown as having a left side wall 25 and a right side wall 26 and the container 23 is pivotally mounted, at substantially its mid-point, upon the mid-point of the top 13 of housing 10. A pair of bearing scales 27 and 28 (left and right), respectively, are suitably laid out or secured on top 13 in spaced relation as seen in FIGURE 2. These scales are arcuate in form and have markings indicating from 0 to 90 degrees running from opposite sides of the detector element 22.

Pivotal mounting means 40 shown in dotted lines in FIG. 2 permits the antenna housing or detector element 22 to rotate in the horizontal plane, about a vertical axis of rotation located at its longitudinal and transverse centers, relative to the main housing 10. The apparatus also includes, as is conventional, although not specifically shown, circuit means passing through the mounting means 40 to couple antenna 24 to the receiver.

A pair of U-shaped members 29 are pivotally secured at their end portions to side walls 12 as by thumb screws or nuts 30. Members 29, when positioned as shown in FIGURE 1, provide a stand for the direction finder, however the members 29 may be moved to the dotted line position and serve as a carrying handle for the instrument. A tab 31 having a viewing slit 32 is pivoted on the top of detector element 22 at or near one end thereof and is pivotable from the position shown in FIGURES 1 and 2 to that shown in FIGURE 3. A similar tab 33 of glass or other transparent material is similarly pivoted near the other end of the detector element and has a few graduations of one degree spacing by which, if the transmitting station or an associated land mark is visible, it can be "sighted" through the slit 32 to place a "fix" on such station. The radio receiver is of the super-heterodyne type and the antenna 24 is directionally sensitive with minimum pickup when the detector element is aligned with the line of sight which includes the signal transmittal station.

In the operation of the invention the direction finder is set as shown in FIGURE 2 and a station to be "fixed" is tuned in by manipulation of tuning knob 15. The direction finder level indicator 20 is then brought to its maximum position by rotation of knob 17. The detector element 22 is then rotated either to the right or to the left to a position as indicated in FIGURE 3 at which the pointer 21 of the level indicator 20 is at a minimum position as shown in FIGURE 5. The "bearing" is thus read at 60 degrees on the right bearing scale 28 and the transmitting station then lies in one direction or the other along line XY.

The level indicator 20 picks up the amplitude of the intermediate frequency of the carrier at the output of the second detector stage of the receiver. It will be observed that the graduations of scales 27 and 28 are so arranged that the readings of the angular movement of the detector element are determined by the particular graduation of the scale which is aligned with side 25 or 26 of the detector element container 23. It will also be observed that a relatively small angular movement of the detector element moves these side edges of the container over a relatively large angular portion of the scales. Furthermore it will be apparent that the zero position of each of these scales is a readable position and is not covered by any portion of the detector element.

The graduation of scales 27 and 28 are shown as being line segments and are so arranged as to be aligned with edges 25 and 26 of the detector element in the several angular positions thereof. These graduations have been arbitrarily selected and arranged in an arcuate manner, however, other equivalent designations may be made along straight lines which meet at an angle, or they may be replaced with dots, small circles or any other type of marking to indicate the degrees of rotation of the detector element. For example, FIGURE 6 shows a scale 28' which may be utilized in lieu of the scale 28.

The invention is adapted for use as an all-purpose navigating instrument. It may be used as a pelorus, to take visual bearings, by raising the tabs 31 and 33. The fact that the visual line of sight to a visible object through tabs 31 and 33 coincides with the radio line of sight of detector element 22 is significant; triangulation may be performed between a visible object and a radio transmitter and the result in degrees is then read directly as the sum of readings on the two scales 27 and 28, or as the difference between two readings on one of those scales.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. In a radio direction finder, the combination comprising:
    a main housing adapted for containing a radio receiver, and having an elongated, substantially flat upper surface;
    an antenna housing having an elongated substantially rectangular configuration in the horizontal plane and disposed upon said upper surface of said main housing;
    an antenna disposed within said antenna housing;
    means mounting said antenna housing from said main housing for pivotal movement in the horizontal plane about a vertical axis spaced inwardly from both longitudinal side edges of said antenna housing;
    and a pair of sets of angular scale indications on said main housing upper surface, one on each end of said main housing, the inner ends of said sets of scale indications being separated by a distance equal to the width of said antenna housing whereby when the longitudinal axis of said antenna housing is disposed perpendicular to the longitudinal axis of said main housing each longitudinal side edge of said antenna housing is aligned with the inner end of the corresponding set of scale indications.

2. The apparatus claimed in claim 1 wherein each of said sets of scale indications includes markings running from zero degrees at its inner end to approximately ninety degrees at its outer end.

3. The apparatus claimed in claim 1 wherein said antenna includes an elongated coil wound on a ferrite rod.

4. The apparatus claimed in claim 1 which further includes a pair of viewing tabs attached to corresponding ends of said antenna housing and pivotally movable between raised and lowered positions.

5. The apparatus claimed in claim 8 which further includes a pair of viewing tabs attached to corresponding ends of said antenna housing and pivotally movable between raised and lowered positions.

References Cited by the Examiner
UNITED STATES PATENTS

| 281,267 | 7/83 | Harmon | 33—72 |
|---|---|---|---|
| 2,388,567 | 11/45 | Patterson | 325—354 |
| 2,837,741 | 6/58 | Heindel et al. | 343—702 |

CHESTER L. JUSTUS, *Primary Examiner.*

KATHLEEN CLAFFY, *Examiner.*